US010425636B2

United States Patent
Bohn (10) Patent No.: US 10,425,636 B2
(45) Date of Patent: Sep. 24, 2019

(54) AUTOMATIC DETECTION AND CORRECTION OF BINOCULAR MISALIGNMENT IN A DISPLAY DEVICE

(71) Applicant: Microsoft Technology Licensing, LLC, Redmond, WA (US)

(72) Inventor: David D. Bohn, Fort Collins, CO (US)

(73) Assignee: Microsoft Technology Licensing, LLC, Redmond, WA (US)

(*) Notice: Subject to any disclaimer, the term of this patent is extended or adjusted under 35 U.S.C. 154(b) by 207 days.

(21) Appl. No.: 15/284,424

(22) Filed: Oct. 3, 2016

(65) Prior Publication Data
US 2018/0098056 A1 Apr. 5, 2018

(51) Int. Cl.
*H04N 13/327* (2018.01)
*G09G 3/00* (2006.01)
(Continued)

(52) U.S. Cl.
CPC ......... *H04N 13/327* (2018.05); *G02B 27/017* (2013.01); *G02B 27/0172* (2013.01); *G02B 27/0179* (2013.01); *G09G 3/003* (2013.01); *H04N 13/144* (2018.05); *H04N 13/344* (2018.05); *G02B 2027/0134* (2013.01); *G02B 2027/0138* (2013.01); *G02B 2027/0181* (2013.01); *G02B 2027/0187* (2013.01); *G02B 2027/0198* (2013.01);
(Continued)

(58) Field of Classification Search
CPC .. H04N 13/327; H04N 13/344; H04N 13/144; H04N 2213/002; G02B 7/12; G02B 27/0101; G02B 27/0172; G02B 2027/0134; G02B 2027/0138; G02B 2027/014; G02B 2027/0178; G02B 2027/0198; G06T 19/006; G09G 3/003; G09G 2320/0693; G06G 2360/14
USPC ......................................................... 348/53
See application file for complete search history.

(56) References Cited

U.S. PATENT DOCUMENTS 7,972,007 B2    7/2011  Facius et al.
8,446,340 B2 *  5/2013  Aharoni ............ G02B 27/0172
                                                         345/7
(Continued)

OTHER PUBLICATIONS

Stengel, et al., "An Affordable Solution for Binocular Eye Tracking and Calibration in Head-mounted Displays", In Proceedings of ACM Multimedia, vol. 23, Oct. 2015, 10 pages.

*Primary Examiner* — Mohammed S Rahaman
*Assistant Examiner* — Jimmy S Lee
(74) *Attorney, Agent, or Firm* — Arent Fox LLP (57) ABSTRACT

A near-to-eye display (NED) device comprises a light sensor, a processor, a first imager to generate a left image of an object for the user's left optical sensor, and a second imager to generate a right image of the object for the user's right optical sensor. The device further comprises at least one light-transmissive optical component arranged to receive concurrently the left image and the right image, the at least one light-transmissive optical component further arranged to direct a first portion of each of the left and right images to the left and right optical sensors, respectively, of the user while directing a second portion of each of the left and right images to the light sensor. The at least one processor detects a binocular misalignment between the left and right images based on output of the light sensor and to control the imagers to correct for the misalignment.

19 Claims, 12 Drawing Sheets

(51) Int. Cl.
  *G02B 27/01*   (2006.01)
  *H04N 13/144*  (2018.01)
  *H04N 13/344*  (2018.01)

(52) U.S. Cl.
  CPC . *G09G 2320/0693* (2013.01); *G09G 2360/14* (2013.01); *H04N 2213/002* (2013.01)

(56) References Cited

U.S. PATENT DOCUMENTS

| | | |
|---|---|---|
| 8,810,600 B2 | 8/2014 | Bohn et al. |
| 8,873,149 B2 | 10/2014 | Bohn et al. |
| 8,917,453 B2 | 12/2014 | Bohn |
| 9,025,252 B2 | 5/2015 | Lewis et al. |
| 2009/0161225 A1 | 6/2009 | Liu |
| 2012/0002163 A1* | 1/2012 | Neal .................... G02B 3/0087 351/201 |
| 2013/0038510 A1 | 2/2013 | Sergey et al. |
| 2014/0211322 A1* | 7/2014 | Bohn ................. G02B 27/0081 359/633 |
| 2014/0375540 A1 | 12/2014 | Ackerman et al. |
| 2014/0375681 A1* | 12/2014 | Robbins ................ G06T 19/006 345/633 |
| 2015/0002528 A1 | 1/2015 | Bohn et al. |
| 2015/0213648 A1 | 7/2015 | Wu et al. |
| 2015/0248046 A1 | 9/2015 | Schowengerdt |
| 2016/0195723 A1* | 7/2016 | Murray .............. G02B 27/0172 359/631 |

* cited by examiner

AUTOMATIC DETECTION AND CORRECTION OF BINOCULAR MISALIGNMENT IN A DISPLAY DEVICE

BACKGROUND

Head-mounted display (HMD) devices are a class of near-to-eye display (NED) devices that have been recently introduced into the consumer marketplace to support visualization technologies such as augmented reality (AR) and virtual reality (VR). An HMD device typically includes components such as light sources, microdisplay modules, controlling electronics, and various optics such as waveguides, lenses, beam splitters, etc. Some HMD devices are binocular so as to provide three-dimensional (3D) visualizations to their users. This is accomplished by concurrently providing, to the user's left and right eyes, separate images that are offset spatially but otherwise identical.

A major cause of user discomfort with binocular HMD devices is binocular misalignment, which is a misalignment between the separate images provided to the user's left and rights eyes when producing a 3D image. The required tolerances for binocular alignment in order to maintain user comfort are extremely difficult to achieve with low cost, lightweight hardware, which is highly desirable in a wearable consumer product such as HMD device. Additionally, binocular misalignment tends to increase over the life of an HMD product.

SUMMARY

Introduced here are a technique for automatic detection of and correction for binocular misalignment in an NED device, such as an HMD device, and an HMD device that incorporates such a technique. The technique involves sampling and comparing a small portion of the images generated for the left and right eye of the user. In certain embodiments of the technique, an HMD device comprises a light sensor, a processor, a first imager to generate a left image of an object for a left eye of a user, and a second imager to generate a right image of the object for a right eye of the user. The HMD device further comprises at least one light-transmissive optical component that receives the left image and the right image from the first and second imagers, respectively. The at least one light-transmissive optical component directs a first portion of each of the left and right images to the user's left and right eyes, respectively, while directing a second portion the left and right images to the light sensor. The processor detects any binocular misalignment between the left and right images based on the output of the light sensor, and controls the first and second imagers to correct for such misalignment by, for example, adjusting the spatial positioning of the left and/or right images generated by the imagers.

In certain embodiments, an AR-capable HMD device includes a partially reflective see-through visor that is part of the display optics used to generate AR images in the HMD device, where the visor can include the above-mentioned optical component(s). For example, in at least some such embodiments, the at least one optical component includes two partially reflective, partially transmissive birdbath-shaped sections of the visor, where each such section is positioned in front of the left or the right eye of the user. Most of the area of each birdbath shaped section reflects light from the imagers to the corresponding eye of the user; however, a small portion of each birdbath shaped section is bent to reflect a corresponding small portion of the light representing the image toward the light sensor, for use detection of binocular misalignment. The amount and spatial location of the portion of light that is redirected in this manner can be chosen so as to be only minimally noticeable to the user, if at all.

Additionally, in certain embodiments, the optical path to the light sensor used for detecting binocular misalignment includes an optically transmissive element with movable parts, to allow adjustment for the interpupillary distance (IPD) of each individual user.

Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

The following description generally assumes that the "user" of a display device is a human, to facilitate description. Note, however, that a display device embodying the technique introduced here can potentially be used by a user that is not human, such as a machine or an animal. Hence, the term "user" herein can refer to any of those possibilities, except as may be otherwise stated or evident from the context. Further, the term "sensor" or optical sensor" is used herein as a general term to refer to a human eye, animal eye, camera or other type of machine-implemented optical receptor designed to detect an image in a manner analogous to a human eye. Further, the terms "near-to-eye display" and "NED" are used herein in a general sense to refer to any display device designed to be operated within a few centimeters (e.g., less than 10 centimeters) of the user's optical sensor and not to imply use by a human user. Likewise, the terms "head-mounted display" and "HMD" do not necessarily connote a human head or use by a human user.

Figure 1:
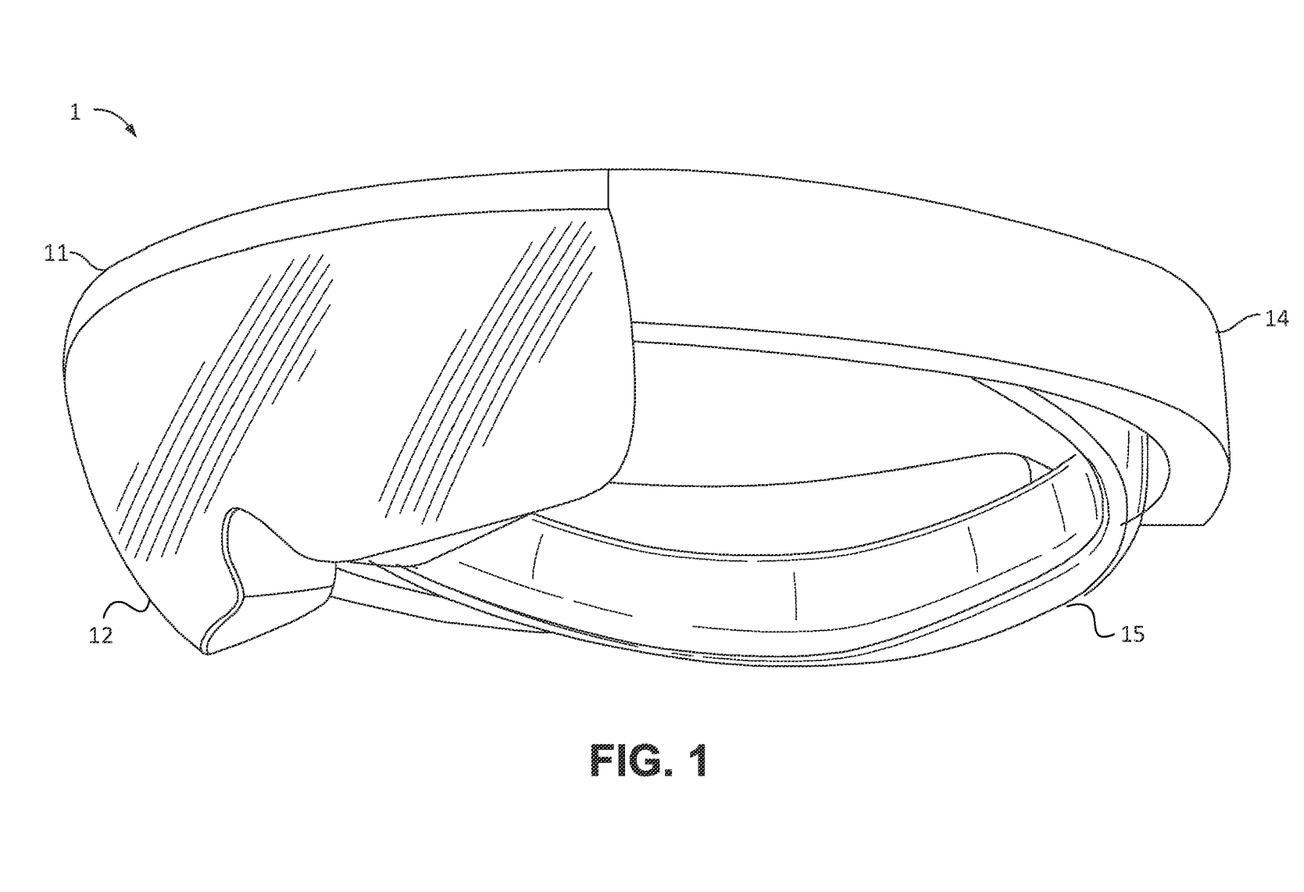
FIG. 1 shows an example of an HMD device that may incorporate the automatic binocular misalignment detection and correction technique introduced herein.

FIG. 1 shows an example of an HMD device in which the technique introduced here can be incorporated. The HMD device 1 may provide virtual reality (VR) and/or augmented reality (AR) display modes for the user, i.e., the wearer of the device. To facilitate description, it is henceforth assumed that the HMD device 1 is designed for AR visualization.

In the illustrated embodiment, the HMD device 1 includes a chassis 11, a transparent visor 12 mounted to the chassis 41, and left and right side arms 14 mounted to the chassis 11. In some embodiments, the visor 12 forms a protective enclosure for various display elements (not shown) that are discussed below. In other embodiments, as described further below, at least a portion of the visor 12 is an integral part of the display optics used to generate AR images in the HMD device 1.

The chassis 41 is the mounting structure for the visor 42 and side arms 44, as well as for various sensors and other components (not shown) that are not germane to this description. A display assembly (not shown) that can generate images for AR visualization is also mounted to the chassis 41 and enclosed within the protective visor 42. The visor assembly 42 and/or chassis 41 may also house electronics (not shown) to control the functionality of the display assembly and other functions of the HMD device 40. The HMD device 40 further includes an adjustable headband 45 attached to the chassis 41, by which the HMD device 40 can be worn on a user's head.

Figure 2:
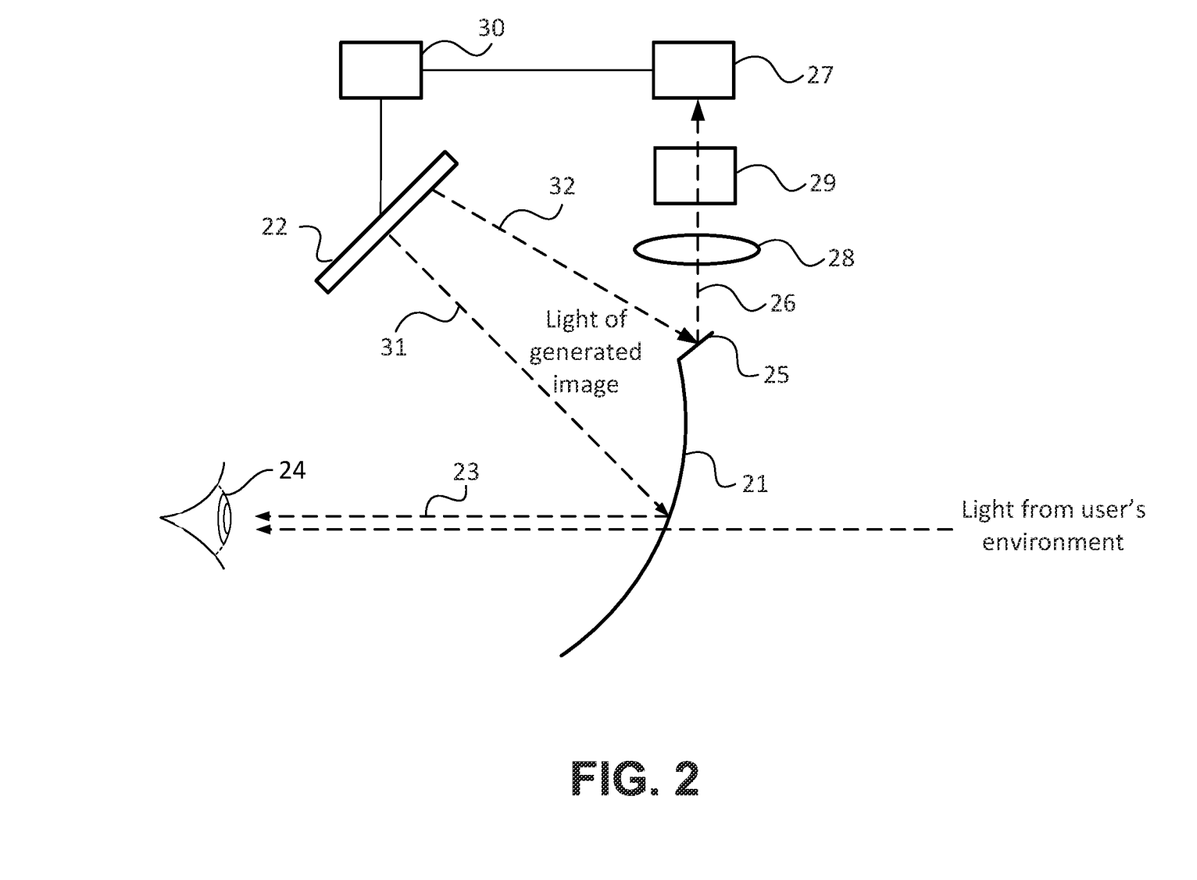
FIG. 2 schematically shows a side view of components that can be used to provide automatic detection of, and correction for, binocular misalignment in an HMD device, according to a first embodiment.

FIG. 2 schematically shows a side view of components that can be used to provide automatic detection of, and correction for, binocular misalignment in an HMD device, such as HMD device 1 in FIG. 1, according to certain embodiments. FIG. 2 shows the configuration for either the left eye or the right eye; an identical set of the illustrated components is provided for each eye, except the camera 27, combiner optic 29 and processor 30 which are shared by the left and right eye subsystems, as discussed below. The configuration includes multiple imagers 22, including at least one imager 22 for each eye of the user. Each imager 22 can be, for example, an emissive organic light emitting diode (OLED) microdisplay imager.

The illustrated embodiment also includes at least a pair of see-through birdbath-shaped optics (hereinafter "birdbath optics") 21, one for each eye of the user. The birdbath optic 21 is see-through so as to allow the user to view his or her physical environment while wearing the HMD. Additionally, each birdbath optic 21 receives light representing either the left image or right image from a corresponding left or right imager 22, which is angled to emit light toward the birdbath optic 21. In at least some embodiments, each birdbath optic 21 is part of a visor of an HMD device.

The birdbath optic 21 reflects a first portion 31 (most) of that light from the imager 22 (i.e., most of the image) along a first optical path 23 to the user's eye 24. The system can be designed to present a virtual image to the user at an apparent distance of, for example, about 2 meters.

In the illustrated embodiment, a small area 25 of the birdbath optic along 21 its upper edge is angled upward so as to reflect a second, much smaller portion 32 of the light from the imager 22 upward along a second optical path 26, to a dedicated camera 27 used for detection of binocular misalignment, instead of to the user's eye 24. This allows sampling of that portion 32 of the image for detection of binocular misalignment. The area 25 has optical power such that the virtual image is at focal infinity. Area 25 samples a portion of the aperture at the edge of the user's field of view. The image is not blocked, i.e., the user can still see the entire image, although the edge of the image corresponding to the sampled area may appear less bright since some of the light is being sampled from the cone of light. The sampling is away from the focal plane of the image, so the image is still visible to the user.

The diverted portions 32 of the left and right image are conveyed concurrently to a set of additional optics to the camera 27. The additional optics in the illustrated embodiment include a collimation lens 28 (one for each eye) and a combiner optic 29. The collimation lens may have a circular shape when viewed in the direction of light propagation through the lens 28. The combiner optic 29, which may be a prism for example, combines the partial left and right images and conveys them concurrently to the camera 27. The output of the camera 27 is provided to a processor 30, which may be the main image generation processor that drives the imagers 22 for generating various visualizations to the user. The processor 30 determines the amount of binocular misalignment by comparing the partial left and right images. The misalignment is then corrected electronically by the processor 30, by moving the image generated by one or both of the imagers until the images are aligned. Note that in some embodiments, the processor 30 or at least some of its functionality may be part of the camera 27. The camera 27 can be any kind of miniature camera, such as a charge coupled device (CCD) based camera. The camera 27 or processor 30 may identify the individual left and right partial images by, for example, synchronizing with the imagers 22, which may alternately display the left and right images at a very high frame rate (e.g., higher than 30 frames per second).

Figure 3:
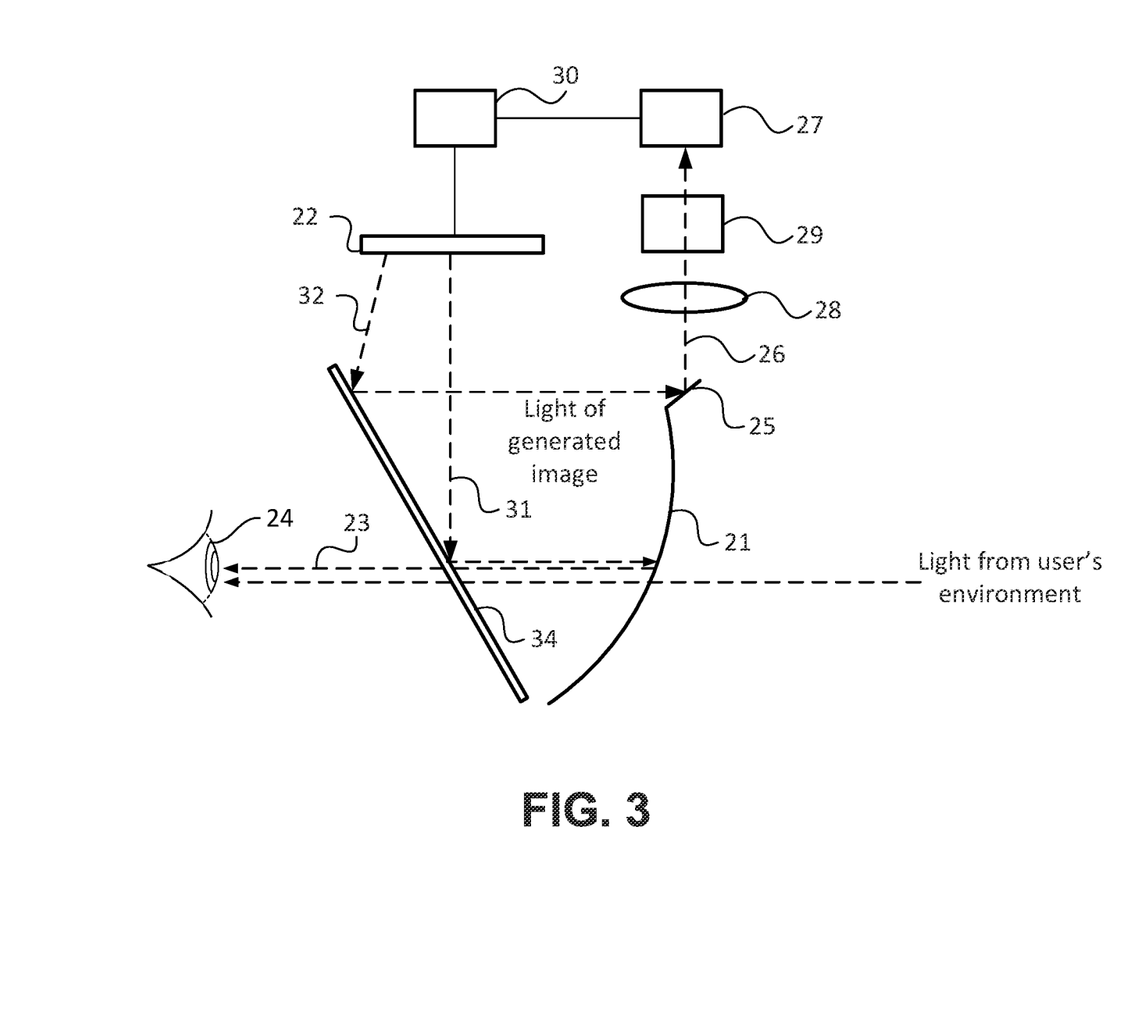
FIG. 3 schematically shows a side view of components that can be used to provide automatic detection of, and correction for, binocular misalignment in an HMD device, according to a second embodiment.

FIG. 3 shows a system for automatic detection and correction of binocular misalignment according to another embodiment. The embodiment of FIG. 3 is similar to that of FIG. 2, but includes an additional optic, namely, a planar beam splitter 34, angled at 45 degrees from vertical (when viewed from the side as in the figure). The beam splitter is transmissive to light propagating horizontally from right to left in the figure, so as to allow the user to see his or her physical environment through it and through the birdbath optic. However, the beam splitter is reflective to light from the imager. In this embodiment, the imager is arranged to emit light directly downward to the beam splitter, which reflects substantially all of that light toward the birdbath optic. The birdbath optic then reflects most of that light back along the first optical path to the user's eye. However, as in the embodiment of FIG. 2, the angled portion of the birdbath optic reflects a small portion of the light from the imager upward, along the second optical path, to the camera, for detection and correction of binocular misalignment.

Figure 4:
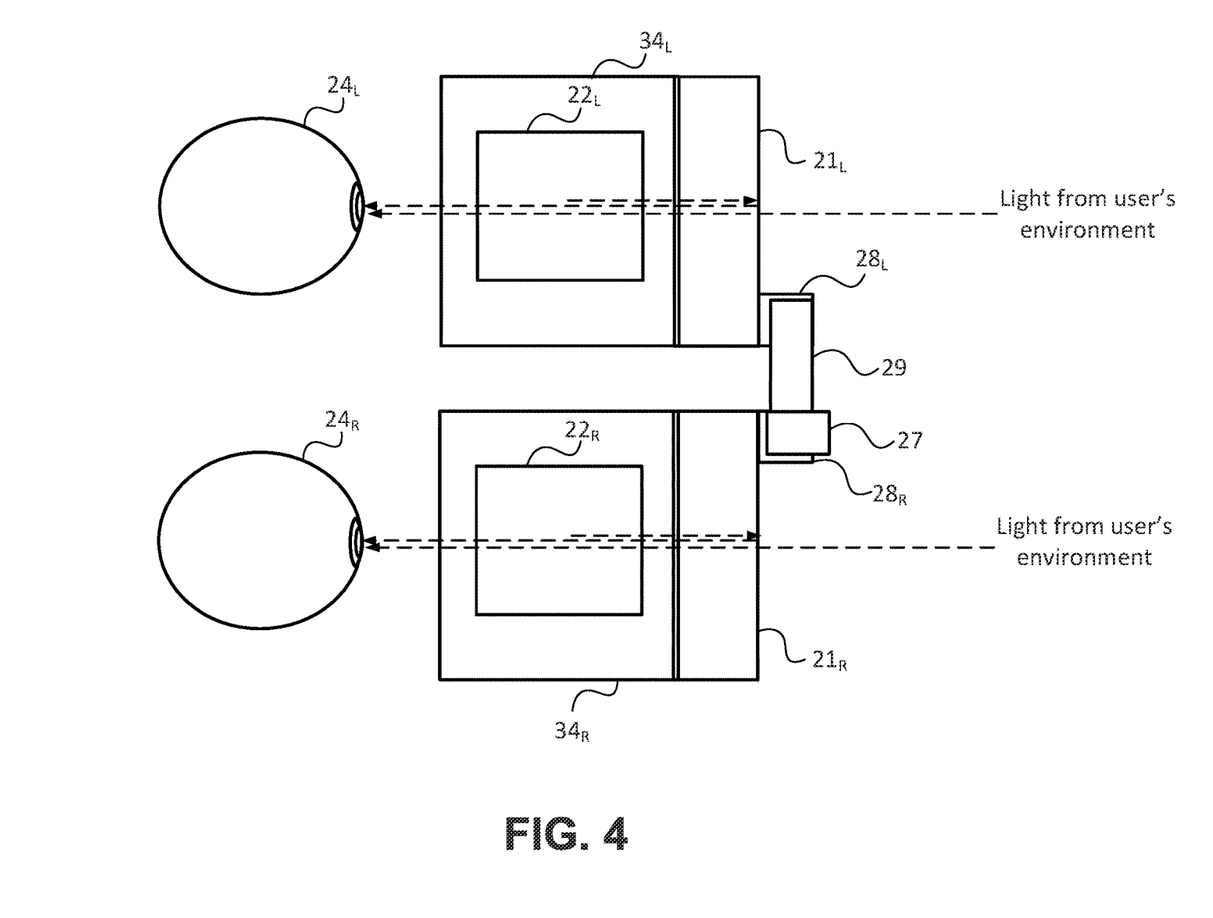
FIG. 4 schematically shows a top view of the embodiment in FIG. 3.

FIG. 4 schematically shows a top view of the embodiment in FIG. 3. The same reference numerals throughout the figures indicate the same or similar components, although subscripts "L" and "R" have been added to certain reference numerals where appropriate to designate left or right side, respectively. It can be seen that for each eye, a separate collimation lens 28 for each conveys a portion of the corresponding image to the combiner optic 29 (e.g., a prism), which combines the light from the two partial images and conveys it to the camera 27.

Figure 5:
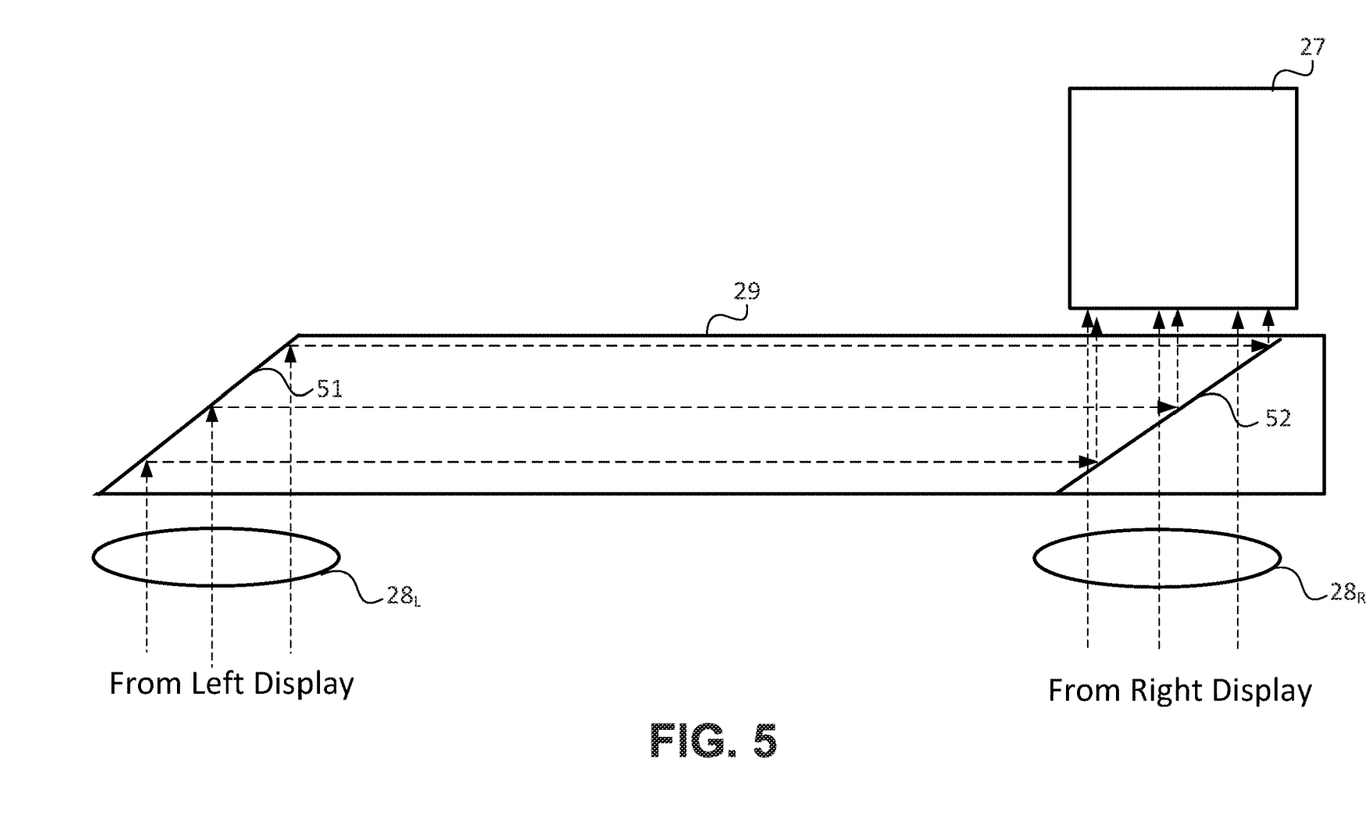
FIG. 5 schematically shows an expanded front view of an example of the optical combiner and other components.

FIG. 5 schematically shows an expanded front view of an example of the optical combiner 29 and other components. In particular, FIG. 5 shows how light from the left and right partial images can be combined in optical combiner (e.g., prism) 29 and conveyed to the camera 27. In the illustrated embodiment, the left end the optical combiner 29 has a 45-degree angled internal surface 51 that is internally reflective to receive the partial left image and reflect it internally 90 degrees to the right. Light propagates through the optical combiner 29 by total internal reflection (TIR). At the other end, the optical combiner 29 includes an internal optical combining interface 52, which is a 50-50 beam splitter with a reflective coating on one surface. The optical combining interface 52 is angled at 45 degrees from vertical, such that light from the partial right image propagating upward that impinges on it is transmitted through the optical combining interface 52 toward the camera 27; however, light from the partial left image propagating to the right that impinges on optical combining interface 52 is reflected 90 degrees upward, toward the camera 27. Thus, light from the two partial images is combined at the optical combining interface 52 and directed toward the camera 27. Of course, it will be recognized that the configuration in FIG. 5 could be reversed so that the combining interface 52 is located at the end where the left image light enters the optical combiner 29.

Figure 6A:
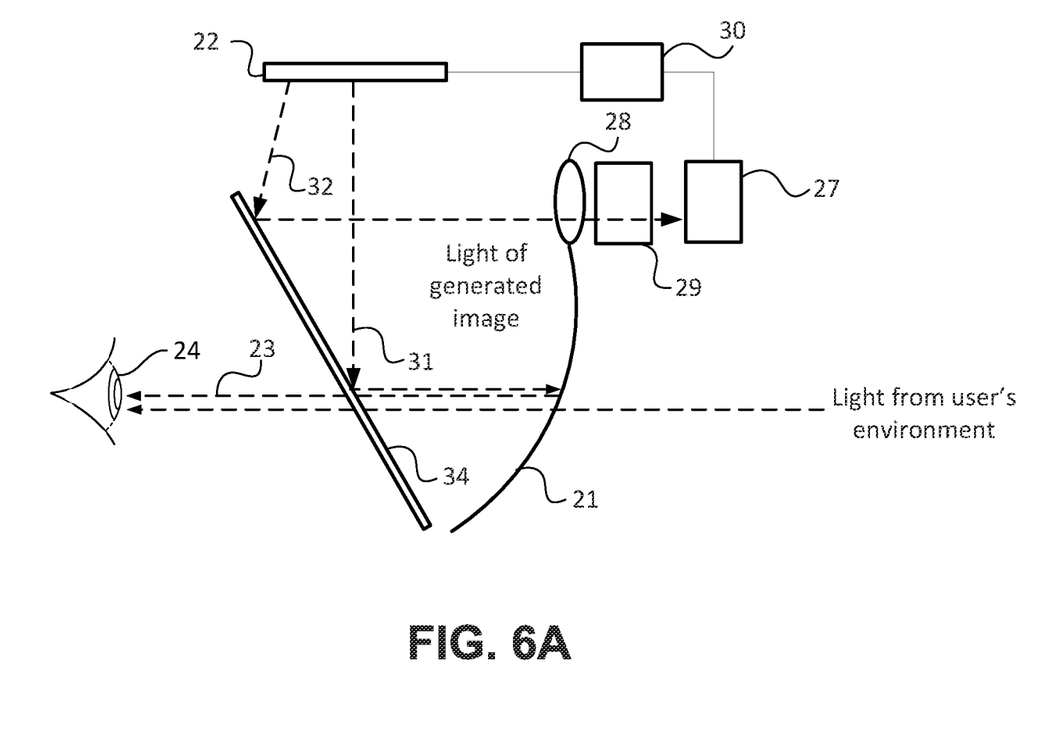
FIG. 6A schematically shows a side view of components that can be used to provide automatic detection of, and correction for, binocular misalignment in an HMD device, where the birdbath optic does not have an angled upper portion.

Note that among other variations, the positions of the combiner optics, camera and/or processor can be changed, as shown in FIG. 6. FIG. 6 shows an alternative embodiment in which the birdbath optic 21 does not have an angled upper portion. Instead, the collimation lens 28 is position directly at the top edge of the birdbath optic 21 to receive a small portion of the image from the imager 22. The combiner optic 29 (e.g., prism) and camera 27 are location just forward (from the user's perspective) of the collimation lens 28. Of course many other variations on this configuration are also possible.

Figure 6B:
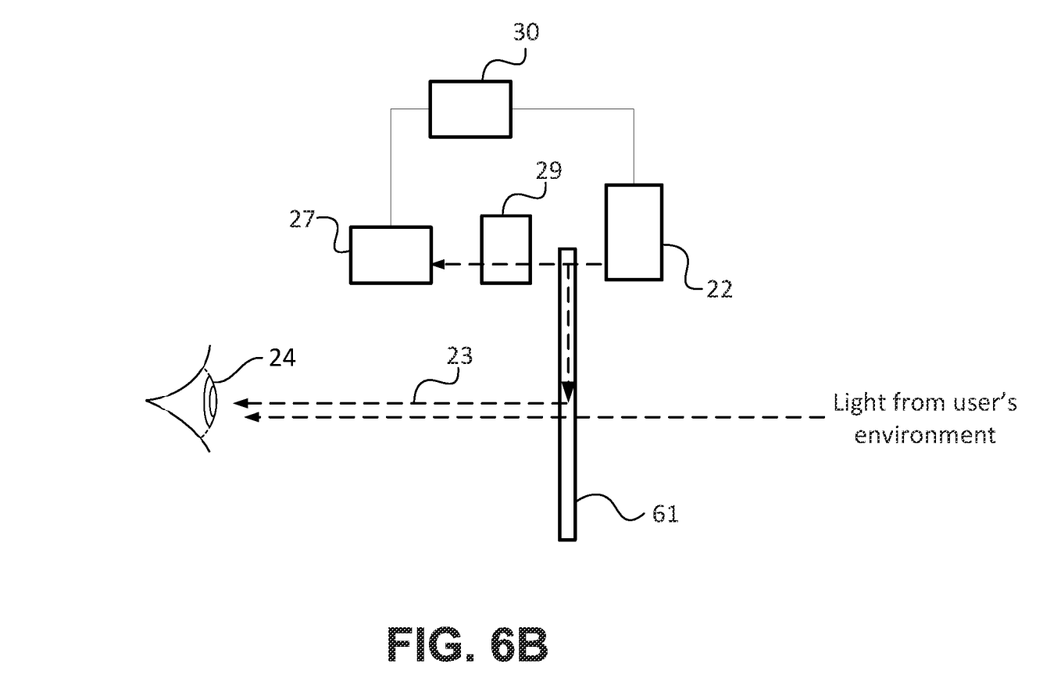
FIG. 6B schematically shows another side view of components of an HMD, for an embodiment in which flat waveguides are used to direct the images into the user's eyes.

FIG. 6B schematically shows another side view of components of an HMD, for an embodiment in which a see-through, flat, rectangular waveguide 61 is used to direct the image into the user's eye, rather than a birdbath optic. A separate flat waveguide 61 may be provided for each eye, as in the birdbath embodiment described above.

Figure 7:
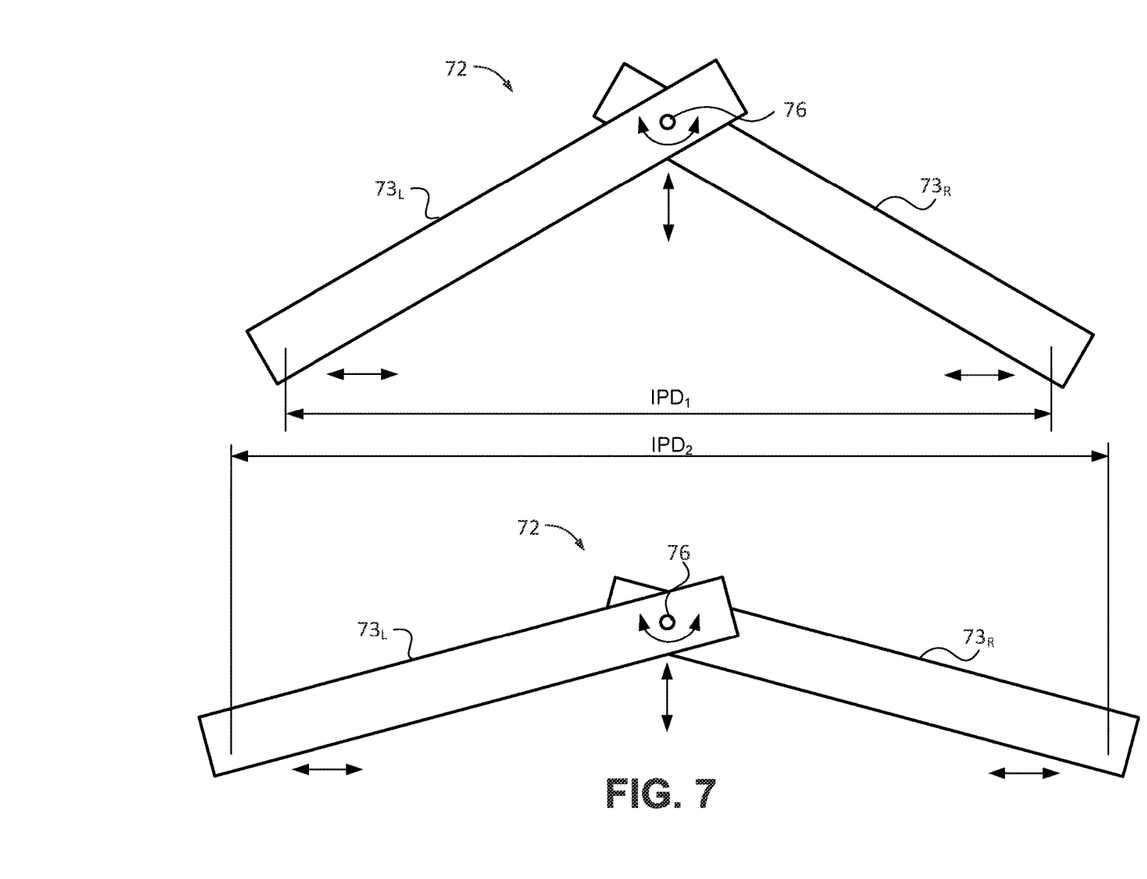
FIG. 7 schematically shows a front view of an embodiment of an adjustable combiner optic that has two segments movable relative to each other to allow adjustment for the interpupillary distance (IPD) of each individual user.
Figure 8:
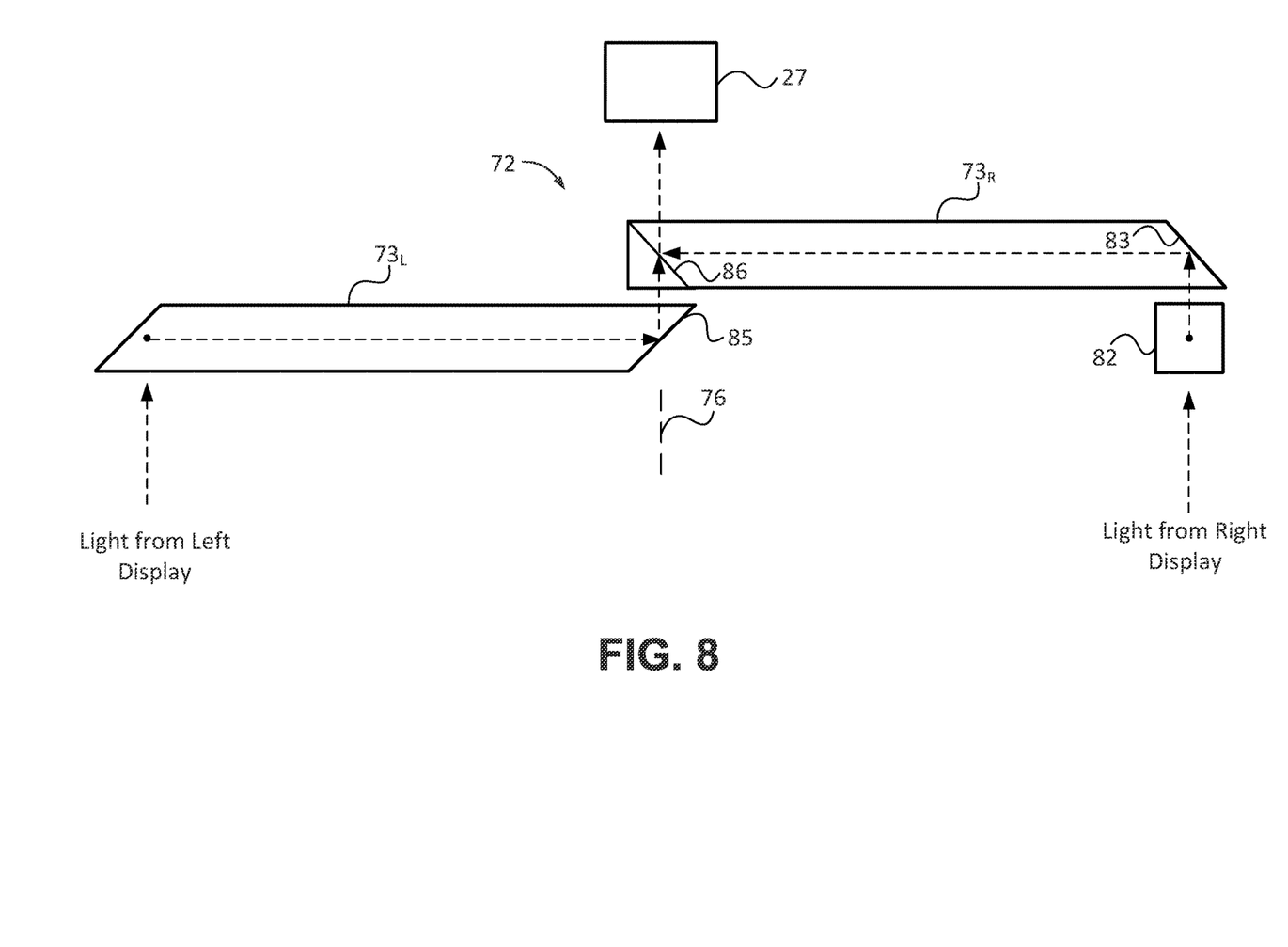
FIG. 8 shows a top of the adjustable combiner optic of FIG. 7.

One problem generally encountered in the design of a binocular HMD device is the wide variation in interpupillary distance (IPD) among users. If the lateral distance between the display elements of the device does not closely match the IPD of the user, the user may experience significant visual discomfort, and the device may be unusable. Accordingly, some embodiments of the binocular misalignment detection/correction system introduced here allow for IPD adjustment to customize the HMD device to the individual user. FIGS. 7 and 8 show how this can be achieved by, for example, having the combiner optic include movable parts to allow adjustment for a specific user's IPD.

More specifically, FIG. 7 schematically shows a front view of an adjustable combiner optic 72 that can replace combiner optic 29 in FIGS. 2 through 6B. The combiner optic 72 can be adjusted between at least two different IPDs, e.g., IPID$_1$ and IPD$_2$, to accommodate at least two different users. The combiner optic 72 has two optically transmissive segments (e.g., prisms) 73$_L$ and 73$_R$ that are connected by a pivot (or hinge) located above or proximate to the user's nose bridge, so as to be rotatable with respect to each other about an axis 76 parallel to the user's line of sight. FIG. 8 schematically shows a top view of the same or a similar embodiment. Collimation lenses (not shown in FIGS. 7 and 8) can be mounted so as to move with the ends of the combiner optic 72. In this embodiment, an additional, transmissive optical element 82 is mounted to the far end of the combiner optic 73$_R$ to equalize the optical path lengths for the left and right partial images. Light representing the partial right image enters and passes through optical element 82 and then into the outer end of combiner element 73$_R$. Upon entering prism element 73$_R$, the light from the right image is reflected by a 45-degree angled internal reflective surface 83 and propagates via TIR to the other end of prism element 73$_R$.

Similarly, light representing the partial left image enters the outer end of prism element 73$_L$ and is reflected by a 45-degree angled internal reflective surface 84 toward the other end of the prism element 73$_L$. The light representing the partial left image propagates to the opposite end of element 73$_L$ via TIR, where it is reflected horizontally by another 45-degree angled internal surface 85 of combiner element 73$_L$ and directed into the other prism element 73$_R$, where it impinges on and is transmitted through partially reflective, partially transmissive combiner interface 86. Light from the partial right image is reflected horizontally toward the camera by combiner interface 86. Hence, combiner interface 86 combines light from the left and right partial images in a manner similar to combiner interface 52 in FIG. 5. The combined light exits the combiner 72 and enters the camera 27. In the illustrated embodiment the camera 27 is positioned at the pivot axis 76 of the two segments 73$_L$ and 73$_R$, which is the geometric center of the combiner 29. In other embodiments, however, the location of the camera 27 may be different.

Figure 9A:
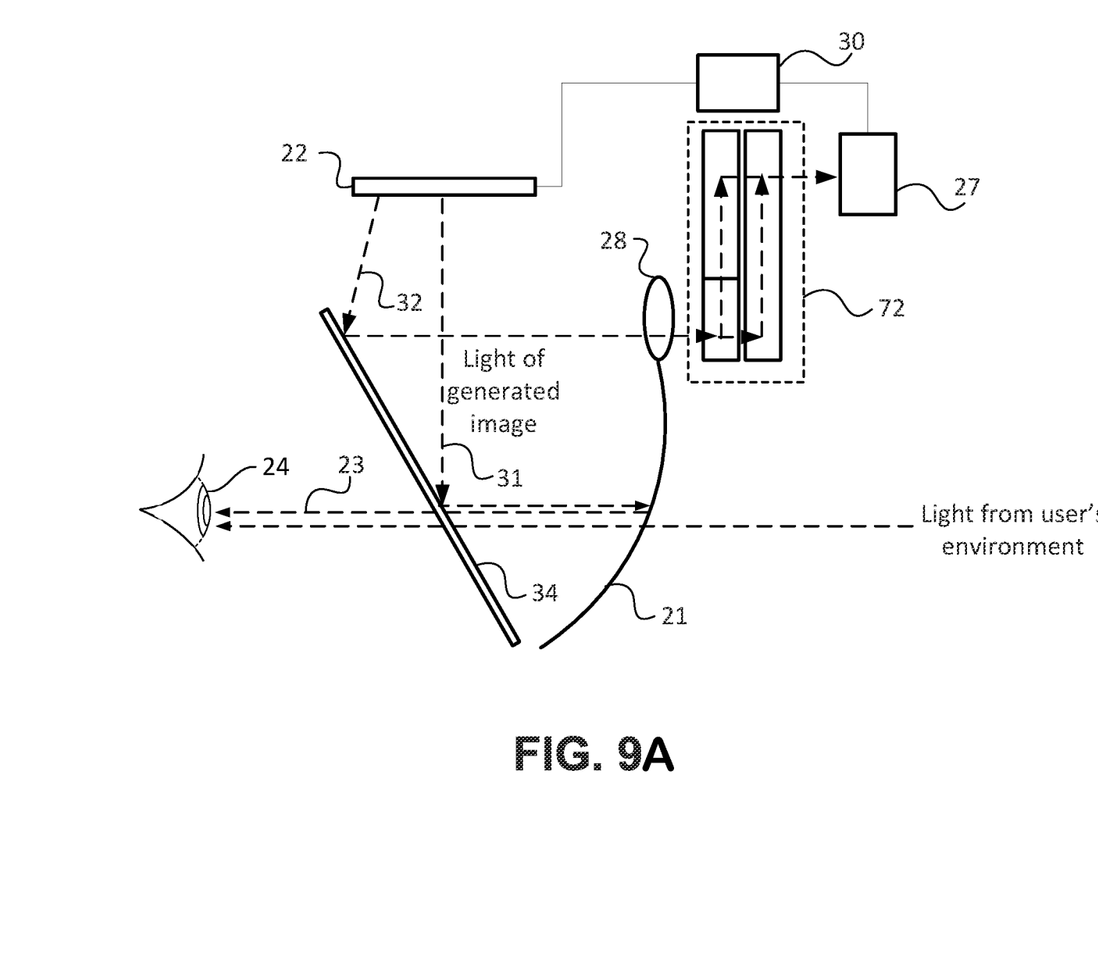
FIG. 9A schematically shows a side view of components of an HMD in including an adjustable combiner optic and a birdbath optic.
Figure 9B:
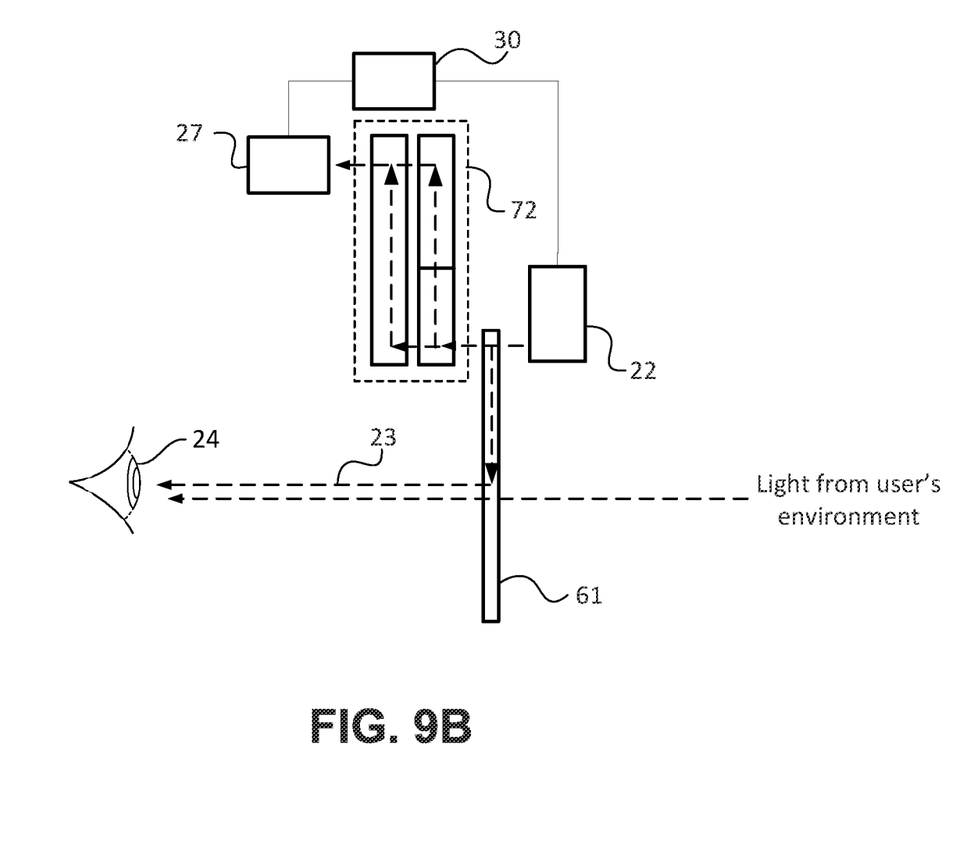
FIG. 9B schematically shows a side view of components of an HMD in including an adjustable combiner optic and a flat rectangular waveguide.

FIG. 9A schematically shows a side view of components of an HMD similar to that of FIG. 6A, but where the IPD-adjustable combiner optic 72 has been substituted for the combiner optic 29. The birdbath optic 21 can also be replaced by flat rectangular waveguides 61 in an IPD-adjustable embodiment, as shown in FIG. 9B, in a manner similar to that shown in FIG. 6B.

Figure 10:
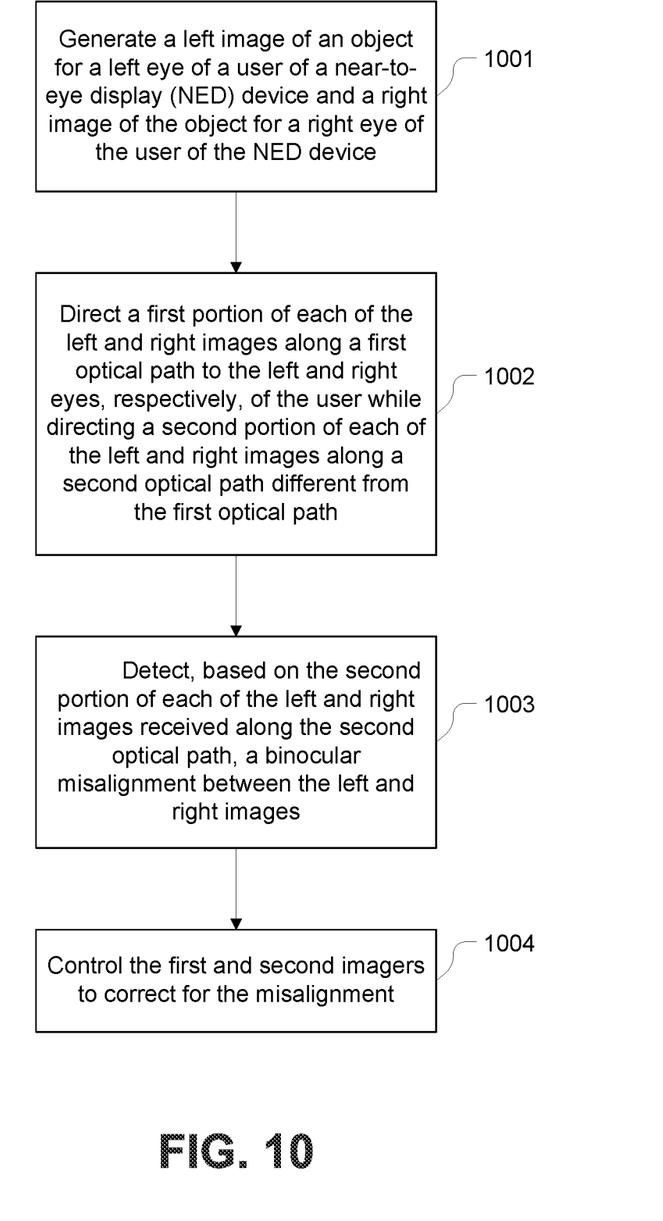
FIG. 10 is a flow diagram illustrating a process for automatically detecting and correcting for binocular misalignment in an NED device.

FIG. 10 illustrates a process for implementing the technique introduced here of automatically detecting and correcting for binocular misalignment in an HMD or other type of binocular NED device. The process begins at step 1001, in which an NED device, such as an HMD device, generates a left image of an object for a left eye of the user and a right image of the object for a right eye of the user. At step 1002, the device direct a first portion of each of the left and right images along a first optical path to the left and right eyes, respectively, of the user while directing a second portion of each of the left and right images along a second optical path different from the first optical path. At step 1003, the device detects, based on the second portion of each of the left and right images received along the second optical path, a binocular misalignment between the left and right images. At step 1004 the device controls the first and second imagers to correct for the misalignment.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

EXAMPLES OF CERTAIN EMBODIMENTS

Certain embodiments of the technology introduced herein are summarized in the following numbered examples:

1. A near-to-eye display (NED) device comprising: a first imager to generate a left image of an object for a left optical sensor of a user of the NED device; a second imager to generate a right image of the object for a right optical sensor of the user; a light sensor; at least one light-transmissive optical component arranged to receive the left image and the right image, the at least one light-transmissive optical component further being arranged to direct a first portion of each of the left and right images to the left and right optical sensors, respectively, of the user and a second portion of each of the left and right images to the light sensor; and at least one processor to detect a binocular misalignment between the left and right images based on output of the light sensor and to control the first and second imagers to correct for the misalignment.

2. The NED device of example 1, wherein the at least processor is configured to detect and correct for the binocular misalignment without requiring any input from the user.

3. The NED device of example 1 or example 2, wherein the at least one light-transmissive optical component comprises two light-transmissive optical components, one for each of the left optical sensor and right optical sensor of the user.

4. The NED device of any of examples 1 to 3, wherein the at least one light-transmissive optical component is partially light-reflective and arranged to receive the first portion of each of the left and right images and to reflect the first portion of each of the left and right images along the first optical path to the left and right optical sensors.

5. The NED device of any of examples 1 to 4, wherein the NED device is arranged to provide the user with an augmented reality (AR) display.

6. The NED device of any of examples 1 to 5, wherein the at least one optical component is arranged to provide the user with a real-world view of an environment of the user through the optical component while the left and right images are overlaid on the real-world view of the environment of the user.

7. The NED device of any of examples 1 to 6, wherein a first portion of the at least one optical component has a birdbath shape, the first portion being arranged to direct a first portion of at least one of the left image or the right image along the first optical path.

8. The NED device of any of examples 1 to 7, wherein a second portion of the at least one optical component has a second shape different from the birdbath shape, to cause the second portion of each of the left and right images to be directed along the second optical path.

9. The NED device of any of examples 1 to 8, further comprising a prism coupled optically between the at least one optical component and the light sensor and arranged to convey the second portion of each of the left and right images to the light sensor.

10. The NED device of any of examples 1 to 9, further comprising a second light-transmissive component coupled optically between the at least one optical component and the light sensor, the second light-transmissive component being adjustable for an interpupillary distance of the user.

11. The NED device of any of examples 1 to 10, further comprising a second light-transmissive component coupled optically between the at least one optical component and the light sensor and arranged to convey the second portion of each of the left and right images to the light sensor, the second light-transmissive component including a plurality of optical segments that are movably coupled to each other.

12. The NED device of any of examples 1 to 11, wherein the plurality of optical segments are movable relative to each other to allow adjustment for an interpupillary distance of the user.

13. The NED device of any of examples 1 to 11, further comprising a second light-transmissive component coupled optically between the at least one optical component and the light sensor and arranged to convey the second portion of each of the left and right images to the light sensor, the second light-transmissive component including a plurality of optical segments connected by a pivot and rotatable with respect to each other about the pivot to allow adjustment for an interpupillary distance of the user.

14. A near-to-eye display (NED) device with binocular misalignment correction, comprising: a first imager to generate a left image of an object for a left optical sensor of a user of the NED device; a second imager to generate a right image of the object for a right optical sensor of the user; a camera; at least two light-transmissive optical components, one for each of the left optical sensor and right optical sensor of the user, arranged to receive concurrently the left image and the right image, the at least two light-transmissive optical components each being arranged to reflect a first portion of the left or right image along a first optical path to the left or right optical sensor, respectively, of the user while reflecting a second portion of the left or right image, respectively, along a second optical path to the camera, wherein the optical component is arranged to provide the user with a real-world view of an environment of the user through the at least two optical components while the left and right images are overlaid on the real-world view of the environment of the user; and at least one processor to detect a binocular misalignment between the left and right images based on output of the camera and to control the first and second imagers to correct for the misalignment, without requiring any input from the user.

15. The NED device of example 14, wherein the at least one optical component is at least a portion of a visor of the NED device.

16. The NED device of example 14 or example 15, wherein a first portion of each of the at least two optical components has a birdbath shape, the first portion being arranged to direct a first portion of at least one of the left image or the right image along the first optical path, and wherein a second portion of each of the at least two optical components has a second shape different from the birdbath shape, to cause the second portion of each of the left and right images to be directed along the second optical path.

17. The NED device of any of examples 1 to 16, further comprising a prism coupled optically between the at least one optical component and the light sensor and arranged to convey the second portion of each of the left and right images to the light sensor.

18. The NED device of any of examples 1 to 17, further comprising a second light-transmissive component coupled optically between the at least one optical component and the light sensor, the second light-transmissive component being adjustable for an interpupillary distance of the user.

19. A method comprising: generating a left image of an object for a left optical sensor of a user of a near-to-eye display (NED) device and a right image of the object for a right optical sensor of the user of the NED device; directing a first portion of each of the left and right images along a first optical path to the left and right optical sensors, respectively, of the user while directing a second portion of each of the left and right images along a second optical path different from the first optical path; detecting, based on the second portion of each of the left and right images received along the second optical path, a binocular misalignment between the left and right images; and controlling the first and second imagers to correct for the misalignment.

20. The method example 19, further comprising: providing the user with a real-world view of an environment of the user while overlaying the left and right images on the real-world view.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A near-to-eye display (NED) device, comprising:
    one or more imagers to generate light representing a left image of an object and light representing a right image of the object;
    at least one light-transmissive optical component arranged to:
        receive the light representing the left image and the light representing the right image,
        direct a first portion of the light representing the left image and a first portion of the light representing the right image along respective first optical paths for displaying the left image and the right image to a user of the NED device, and
        direct a second portion of the light representing the left image and a second portion of the light representing the right image along respective second optical paths,
        wherein the first portion of the light representing the left image is a greater portion of light than the second portion of the light representing the left image, and the first portion of the light representing the right image is a greater portion of light than the second portion of the light representing the right image;
    a light sensor configured to:
        receive the second portion of the light representing the left image and the second portion of the light representing the right image from the respective second optical paths,
        detect a binocular misalignment between the second portion of the light representing the left image and the second portion of the light representing the right image, and
        generate an output based on the binocular misalignment; and
    at least one processor configured to receive the output from the light sensor, and to control the one or more imagers to align the left image to the right image based on the binocular misalignment.

2. The NED device of claim 1, wherein the at least one processor is configured to align the left image to the right image without requiring any input from the user.

3. The NED device of claim 1, wherein the at least one light-transmissive optical component comprises two light-transmissive optical components, one for each of a left optical sensor and a right optical sensor of the user.

4. The NED device of claim 1, wherein the at least one light-transmissive optical component is partially light-reflective.

5. The NED device of claim 1, wherein the NED device is arranged to provide the user with an augmented reality (AR) display.

6. The NED device of claim 1, wherein the at least one light-transmissive optical component is further arranged to provide the user with a real-world view of an environment of the user through the at least one light-transmissive optical component while the left image and the right image are overlaid on the real-world view of the environment of the user.

7. The NED device of claim 1, wherein a first portion of the at least one light-transmissive optical component has a birdbath shape, the first portion of the at least one light-transmissive optical component being arranged to direct at least one of the first portion of the light representing the left image or the first portion of the light representing the right image along respective first optical paths.

8. The NED device of claim 7, wherein a second portion of the at least one light-transmissive optical component has a second shape different from the birdbath shape, to direct at least one of the second portion of the light representing the left image or a second portion of the light representing the right image along respective second optical paths.

9. The NED device of claim 1, further comprising a prism coupled optically between the at least one light-transmissive optical component and the light sensor and arranged to convey at least one of the second portion of the light representing the left image or the second portion of the light representing the right image to the light sensor.

10. The NED device of claim 1, further comprising a second light-transmissive component coupled optically between the at least one light-transmissive optical component and the light sensor, the second light-transmissive component being adjustable for an interpupillary distance of the user.

11. The NED device of claim 1, further comprising a second light-transmissive component coupled optically between the at least one light-transmissive optical component and the light sensor and arranged to convey at least one of the second portion of the light representing the left image or the second portion of the light representing the right image to the light sensor, the second light-transmissive component including a plurality of optical segments that are movably coupled to each other.

12. The NED device of claim 11, wherein the plurality of optical segments are movable relative to each other to allow adjustment for an interpupillary distance of the user.

13. The NED device of claim 1, further comprising a second light-transmissive component coupled optically between the at least one light-transmissive optical component and the light sensor and arranged to convey at least one of the second portion of the light representing the left image or the second portion of the light representing the right image to the light sensor, the second light-transmissive component including a plurality of optical segments connected by a pivot and rotatable with respect to each other about the pivot to allow adjustment for an interpupillary distance of the user.

14. The NED device of claim 1, wherein the light sensor is configured to detect the binocular misalignment by comparing the second portion of the light representing the left image and the second portion of the light representing the right image.

15. The NED device of claim 1, wherein the at least one processor is further configured to control the one or more imagers to move one or both of the light representing left image and the light representing the right image to align the left image and the right image.

16. A method comprising:
generating light representing a left image of an object for a left optical sensor of a user of a near-to-eye display (NED) device and light representing a right image of the object for a right optical sensor of the user of the NED device;
directing a first portion of the light representing the left image and a first portion of the light representing the right image along a first optical path to the left optical sensor and the right optical sensor, respectively, of the user, and a second portion of the light representing the left image and a second portion of the light representing the right image along a second optical path different from the first optical path, wherein the first portion of the light representing the left image is a greater portion of light than the second portion of the light representing the left image, and the first portion of the light representing the right image is a greater portion of light than the second portion of the light representing the right image;
detecting a binocular misalignment between the second portion of the light representing the left image and the second portion of the light representing the right image; and
controlling one or more imagers to align the left image to the right image based on the binocular misalignment.

17. The method claim 16, further comprising:
providing the user with a real-world view of an environment of the user while overlaying the left and right images on the real-world view.

18. The method of claim 16, further comprising:
detecting the binocular misalignment by comparing the second portion of the light representing the left image and the second portion of the light representing the right image.

19. The method of claim 16, further comprising:
controlling the one or more imagers to move one or both of the light representing the left image and the light representing the right image to align the left image and the right image.

* * * * *